(12) United States Patent
Zlotnick et al.

(10) Patent No.: US 11,416,342 B2
(45) Date of Patent: Aug. 16, 2022

(54) AUTOMATICALLY CONFIGURING BOOT SEQUENCE OF CONTAINER SYSTEMS FOR DISASTER RECOVERY

(71) Applicant: EMC IP Holding Company LLC, Hopkinton, MA (US)

(72) Inventors: David Zlotnick, Tel Aviv (IL); Assaf Natanzon, Tel Aviv (IL); Boris Shpilyuck, Ashdod (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 479 days.

(21) Appl. No.: 16/503,376

(22) Filed: Jul. 3, 2019

(65) Prior Publication Data
US 2021/0004292 A1 Jan. 7, 2021

(51) Int. Cl.
*G06F 11/00* (2006.01)
*G06F 11/14* (2006.01)
*G06F 9/4401* (2018.01)

(52) U.S. Cl.
CPC ........ *G06F 11/1417* (2013.01); *G06F 9/4416* (2013.01); *G06F 2201/815* (2013.01)

(58) Field of Classification Search
CPC ............ G06F 11/1417; G06F 11/0712; G06F 11/1484; G06F 11/2023; G06F 9/4416; G06F 2201/815
See application file for complete search history.

(56) References Cited

U.S. PATENT DOCUMENTS

| | | | |
|---|---|---|---|
| 9,778,944 B1 * | 10/2017 | Madasamy | G06F 9/45533 |
| 2013/0246838 A1 * | 9/2013 | Reddy | G06F 11/1484 714/3 |
| 2017/0168903 A1 * | 6/2017 | Dornemann | G06F 11/2097 |
| 2019/0188094 A1 * | 6/2019 | Ramamoorthi | G06F 11/2023 |
| 2019/0303261 A1 * | 10/2019 | White | G06F 11/1484 |
| 2020/0167234 A1 * | 5/2020 | Nair | G06F 11/008 |
| 2020/0401316 A1 * | 12/2020 | Hankins | G06F 3/065 |

* cited by examiner

*Primary Examiner* — Joseph D Manoskey
(74) *Attorney, Agent, or Firm* — Staniford Tomita LLP

(57) ABSTRACT

Embodiments for systems and methods of providing a boot order for containers in a cloud native application environment by collecting container environment data from a first container site; determining dependencies and connections between the containers and applications executed within the containers based on a number of system parameters; calculating a recommended order for booting or rebooting the containers during a disaster recovery process; and communicating the recommended order to a system administrator through a graphical user interface (GUI) for acceptance or modification by the system administrator.

18 Claims, 8 Drawing Sheets

RECOMMENDED BOOT ORDER

| PRIORITY | APP/CONTAINER | USER COMMAND | |
|---|---|---|---|
| 1 | WEBSERVER APP 1 | ☐ ACCEPT | ☐ MODIFY |
| 2 | WEBSERVER APP 2 | ☐ ACCEPT | ☐ MODIFY |
| 3 | FILESERVER APP 1 | ☐ ACCEPT | ☐ MODIFY |
| 4 | DATABASE APP 1 | ☐ ACCEPT | ☐ MODIFY |

AUTOMATICALLY CONFIGURING BOOT SEQUENCE OF CONTAINER SYSTEMS FOR DISASTER RECOVERY

TECHNICAL FIELD

Embodiments are generally directed to network backup systems, and more specifically to automatically configuring boot sequences in container systems for disaster recovery operations.

BACKGROUND

Containerization involves encapsulating an application in a container with its own operating environment and has been developed as a lightweight alternative to full machine virtualization. This technology has gained recent prominence with the open-source Docker, in which containers are deployed as portable, self-sufficient containers that can run on everything from physical computers to virtual machines (VMs), bare-metal servers, cloud clusters, etc. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. The Kubernetes system (developed by Google) is a popular container management platform for managing containerized applications in a clustered environment.

Container systems like Docker/Kubernetes are typically used to develop so-called "cloud native" applications. Cloud native is an approach to building and running applications that exploits the advantages of the cloud computing delivery model. Each part of an application is packaged in its own container and dynamically managed and actively scheduled to optimize resource utilization. The cloud native application architecture is disrupting the way organizations build software because it generates massive productivity boosts. It provides major benefits in getting from idea to production faster and scaling more easily to thereby help remedy one of the biggest challenges of modern software. Cloud native patterns and practices, have found their way into the industry through popular open source projects. Developers from small startups all the way to huge corporations are adopting those technologies and practices and weaving them into the software fabric of their businesses.

Disaster recovery (DR) is a critical process for organizations, and is required to guarantee business continuity. For cloud native systems that are composed of microservices in a dynamic environment, however, the disaster recovery process is complex and not straightforward. One of the challenges when performing a disaster recovery in cloud native container-based environments is to determine and configure the order in which the containers should be started during recovery of the production environment on the DR site. The approach used in traditional IT systems of performing recovery operations semi-automatically by scripts or fully manually by an administrator is not suitable for the dynamic environment of container systems.

FIG. 1 illustrates an example of the traditional solution for configuring the boot order of virtual machines in an example GUI display 100. As shown in FIG. 1, a number of VMs 12 such as for web, mail, file, and database servers are all listed in the GUI. A manual configuration control panel in the form of a drop-down menu is provided so that the user can manually select the priority 14 of each VM relative to the others using a numerical scale (e.g., 1 to 5). In this method, the user needs to select the boot priority of the VMs, and upon reboot, all priority 1 machines are booted first, and then followed by the rest by priority order. This present method of setting the boot order of VMs is obviously complex, tedious and error prone. It is also generally insufficient for DR use cases, and does not accommodate the dynamic nature of cloud native applications.

Although partial control over the containers' boot sequence can be applied in the system configuration of Docker/Kubernetes systems, this does not provide a sufficient solution for disaster recovery purposes, because it does not address issues like environment and system configuration changes on the DR site, or the disaster recovery process of multiple containerized applications that may have cross dependencies.

What is needed, therefore, is a method of providing a system for automating the disaster recovery process of container-based environments to reduce the entry barriers for a successful implementation of disaster recovery in container-based systems, and that automatically configures the boot sequence of the entire system to improve the failover procedure.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7 illustrates an example GUI display area showing the recommended container boot order to a user, under some embodiments.

DETAILED DESCRIPTION

Figure 1:
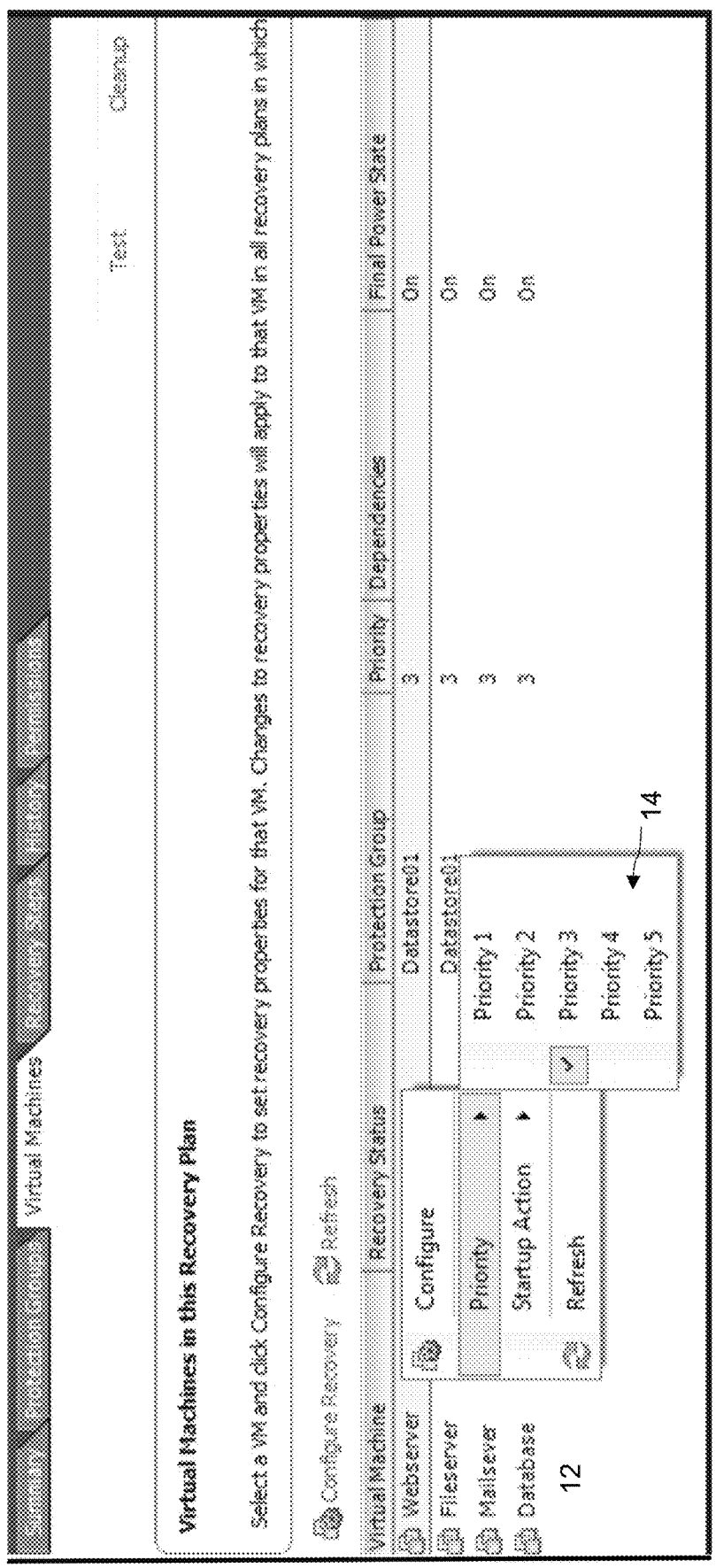
FIG. 1 illustrates a manual method of configuring the boot order of containerized virtual machines as presently known.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system for automating the disaster recovery process of container-based environments, and that automatically configures the boot sequence of the entire system to improve the failover procedure. In an embodiment, the container management system comprises a Kubernetes system, though all embodiments are not so limited. Other container management systems similar to Kubernetes may also be used, and specific reference to Kubernetes is meant to be primarily for example or illustration.

Figure 2:
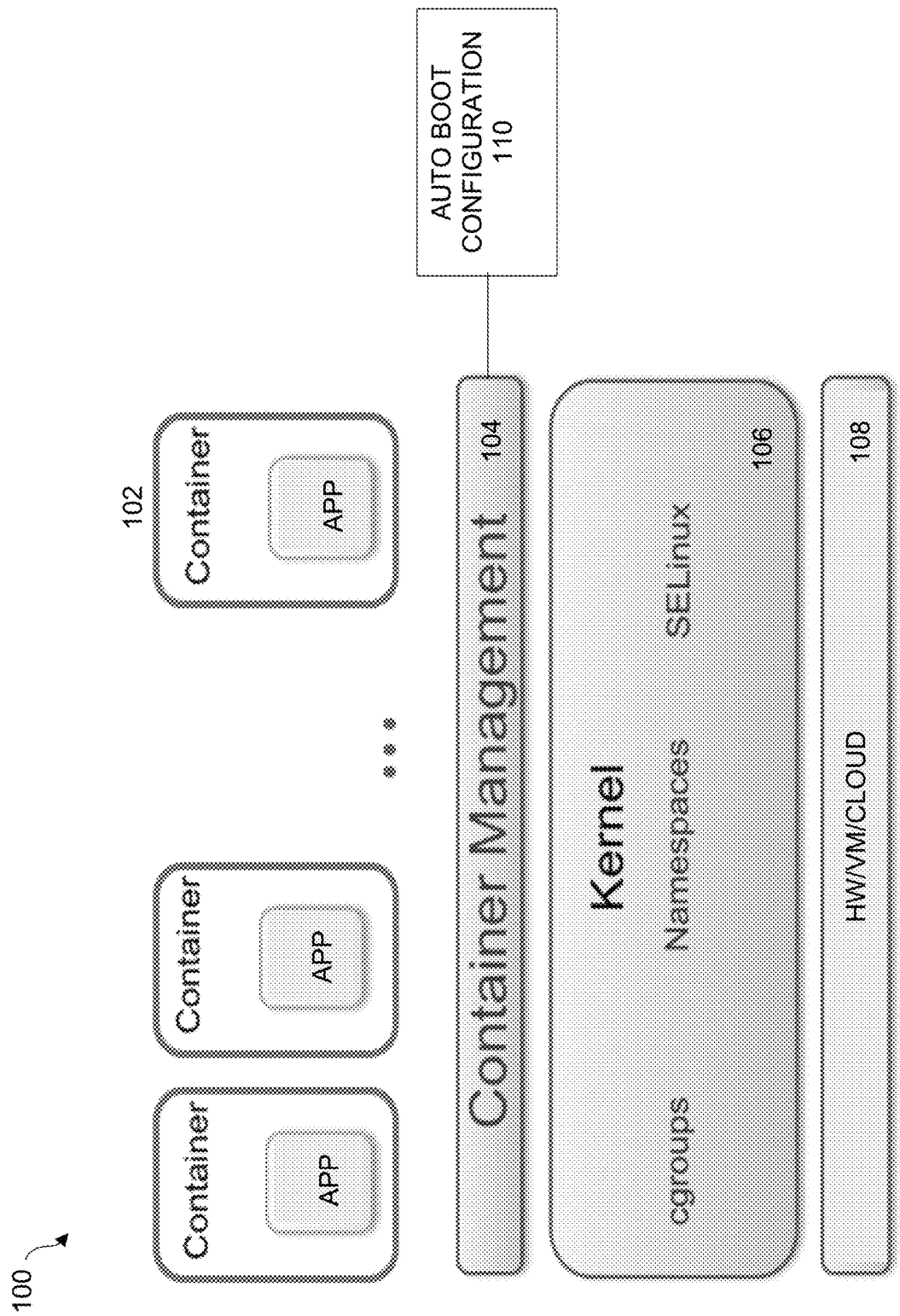
FIG. 2 is a diagram of a container management system implementing an auto boot configuration process, under some embodiments.

FIG. 2 illustrates a container management system that includes or executes an automatic container boot configuration procedure, under some embodiments. As shown in FIG. 2, system 100, a number of applications (apps) are encapsulated in respective containers 102 so that each application operates within its own operating environment. The containers are deployed as portable, self-sufficient data structures that can run any practical hardware platform 108 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 100 utilizes the Docker container format to abstract the lower layer of container technology, though other similar formats may also be used. An application can run in multiple containers, and usually a container will just run a single micro service.

The container management layer 104 is used to automate the creation, destruction, deployment and scaling of the containers 102. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration. For the embodiment of FIG. 2, an automatic container boot configuration process 110 is used in conjunction with the container management layer 104, as described in greater detail later in this description.

Kubernetes Container Management Platform

In an embodiment, the container management layer 104 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster the foundation the system and the Kubernetes objects that represent the containerized applications all run on top of a cluster.

Figure 3:
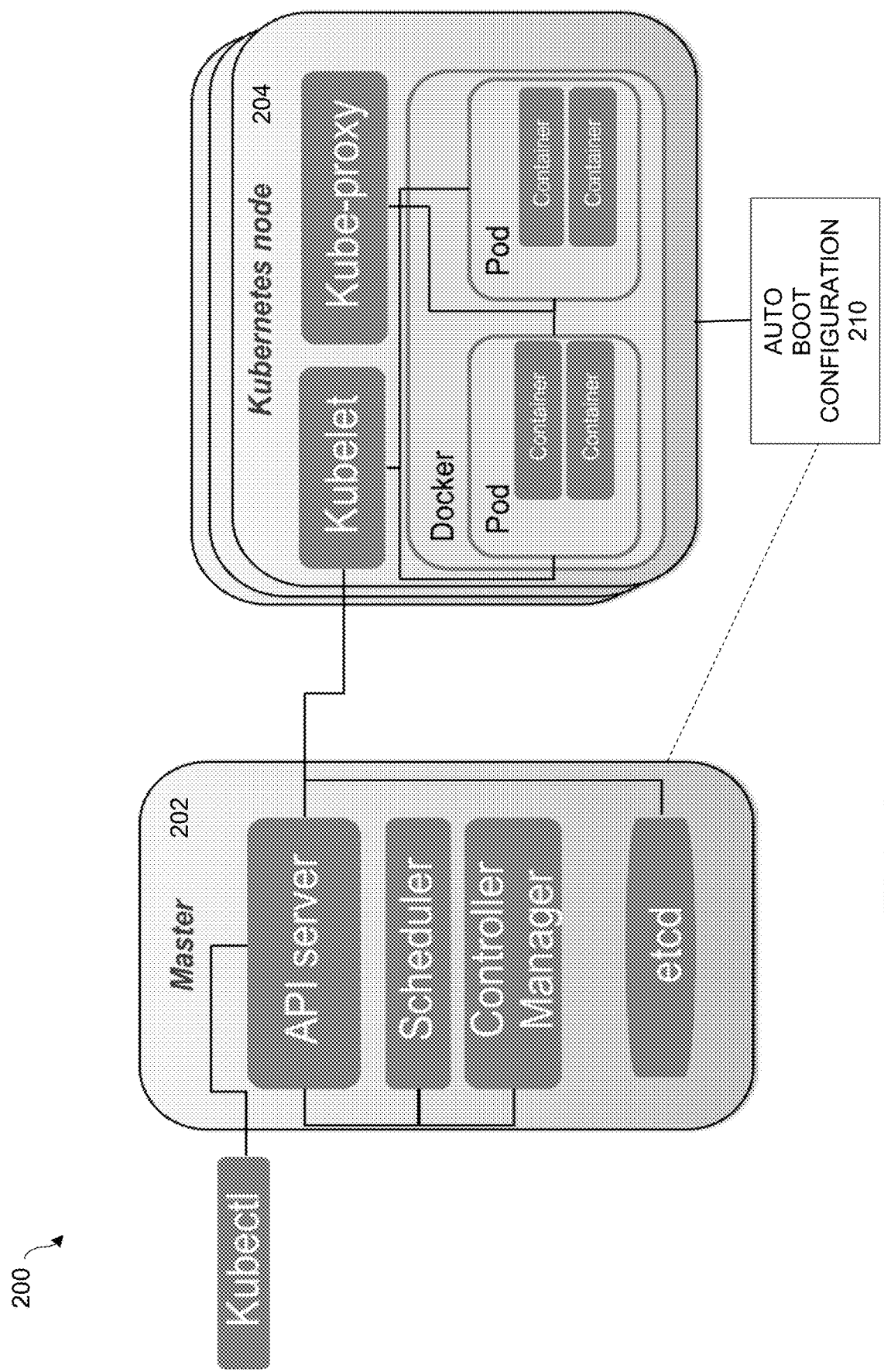
FIG. 3 is a block diagram that illustrates the architecture of a Kubernetes platform implementing an auto boot configuration process, under some embodiments.

FIG. 3 is a block diagram 200 that illustrates the architecture of a Kubernetes platform implementing an auto boot configuration process, under some embodiments. The controlling services in a Kubernetes cluster are called the master 202, or control plane, components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

One of the fundamental components that Kubernetes needs to function is a globally available configuration store. The etcd project, developed by the CoreOS team, is a lightweight, distributed key-value store that can be distributed across multiple nodes. Kubernetes uses etcd to store configuration data that can be used by each of the nodes in the cluster. This can be used for service discovery and represents the state of the cluster that each component can reference to configure or reconfigure themselves. By providing a simple HTTP/JSON API, the interface for setting or retrieving values is very straight forward. Like most other components in the control plane, etcd can be configured on a single master server or, in production scenarios, distributed among a number of machines. The only requirement is that it be network accessible to each of the Kubernetes machines.

One of the most important master services is an API server. This is the main management point of the entire cluster, as it allows a user to configure many of Kubernetes' workloads and organizational units. It also is responsible for making sure that the etcd store and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, etc.

The process that actually assigns workloads to specific nodes in the cluster is the scheduler. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the master components, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed. One key assumption that Kubernetes makes is that a dedicated subnet is available to each node server. This is not the case with many standard clustered deployments. For instance, with CoreOS, a separate networking fabric called flannel is needed for this purpose. Docker must be configured to use this so that it can expose ports in the correct fashion. In an embodiment, the continuous replication process is executed in each node or at least some nodes 204 of the system 200.

The main contact point for each node with the cluster group is through a small service called kubelet. This service is responsible for relaying information to and from the control plane services, as well as interacting with the etcd store to read configuration details or write new values. The kubelet service communicates with the master components to receive commands and work. Work is received in the form of a "manifest" which defines the workload and the operating parameters. The kubelet process then assumes responsibility for maintaining the state of the work on the node server.

In order to deal with individual host subnetting and in order to make services available to external parties, a small proxy service is run on each node server. This process forwards requests to the correct containers, can do primitive load balancing, and is generally responsible for making sure the networking environment is predictable and accessible, but isolated.

While containers are the used to deploy applications, the workloads that define each type of work are specific to Kubernetes. Different types of "work" can be assigned, as described below. A pod is the basic unit that Kubernetes deals with. Containers themselves are not assigned to hosts. Instead, closely related containers are grouped together in a pod. A pod generally represents one or more containers that should be controlled as a single "application." This association leads all of the involved containers to be scheduled on the same host. They are managed as a unit and they share an environment. This means that they can share volumes and IP space, and can be deployed and scaled as a single application. Pods can be thought of as a single virtual computer in order to best conceptualize how the resources and scheduling should work. The general design of pods usually consists of the main container that satisfies the general purpose of the pod, and optionally some helper containers that facilitate related tasks. These are programs that benefit from being run and managed in their own container, but are heavily tied to the main application. Horizontal scaling is generally discouraged on the pod level because there are other units more suited for the task.

A pod is thus the basic building block of Kubernetes and comprises one or more containers and share storage resources, and network resources. Pods run in a shared context, share the same IP using different port for containers. Containers within a pod can communicate using inter process communication. In general though, pods are not durable entities and will not survive failures.

Within the context of Kubernetes, the term "service" may be used to have a very specific definition when describing work units. A service, when described this way, is a unit that acts as a basic load balancer and ambassador for other containers. A service groups together logical collections of pods that perform the same function to present them as a single entity. This allows a user to deploy a service unit that is aware of all of the backend containers to pass traffic to. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. By deploying a service, a user easily gain discover-ability and can simplify container designs.

With respect to data replication, a more complex version of a pod is a replicated pod. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers.

Replica controllers are generally responsible for watching objects state and trying to bring it to the desired state, and work with a ReplicaSet and Deployment objects. A ReplicaSet owns and manages pods and ensures that a specified number of pod "replicas" are running at any given time. A ReplicaSet can be auto-scaled by an Horizontal Pod Autoscalers (HPA). It is mainly used by Deployments as a mechanism to orchestrate pods. A Deployment owns and manages ReplicaSets, provides declarative updates for Pods and ReplicaSets, supports rolling updates, and supports rollbacks.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. To get a list of backend servers that a service should pass traffic to, it usually selects containers based on label.

Similarly, replication controllers give all of the containers spawned from their templates the same label. This makes it easy for the controller to monitor each instance. The controller or the administrator can manage all of the instances as a group, regardless of how many containers have been spawned.

Labels are given as key-value pairs. Each unit can have more than one label, but each unit can only have one entry for each key. Pods can be given a "name" key as a general purpose identifier, or they can be classified by various criteria such as development stage, public accessibility, application version, etc. In many cases, many labels can be assigned for fine-grained control. A user can then select based on a single or combined label requirements.

Auto Boot Configuration

As shown and described with respect to FIG. 1, present manual methods of setting the VM boot order of container systems is complex and tedious. Cloud native systems that are running containers have a complex and dynamic configuration. The traditional approach shown in FIG. 1 in which the administrator needs to manually configure the boot order is not suitable for such systems, as this can take significant amount of time and hold back the initial setup of disaster recovery tools, thereby increasing the risk for the organization. This manual method is also error prone, as the manual boot order configuration of cloud native environments may involve very large numbers of containers, thus introducing several possibilities for error. The administrator may configure the system incorrectly leading to failures during recovery due to possible race conditions that may be created by these mistakes, such as if dependent containers were booted with the same priority.

In general, cloud native applications are dynamic, so container driven applications are updated more frequently than traditional systems built on virtual machines, and each update imposes the possibility of data corruption. Often microservice applications are interdependent, hence failure of a given microservice application during a disaster recovery process is likely to impact other dependent microservice applications. Controlling the boot order of container services by system configuration is generally insufficient for DR use cases. The container boot order settings in Docker/Kubernetes systems does not address issues like environment and system configuration changes on the DR site, or DR processes of multiple containerized applications that may have cross-dependencies. Additionally, the system configuration typically does not provide sufficient control because it does not actually verify successful services startup before launching subsequent containers, as it just provides a simple and naïve initiation sequence.

Embodiments of the auto boot configuration process 110 solve these issues associated with present manual methods by automating the boot order sequence of cloud native container based environments. The system includes a recommendation engine that sets the boot order, dependencies and priority of each container based on several different parameters. The user will then be able to review and fix the boot order, but it is expected that in most cases the automatic setup will be sufficient to automatically produce the correct boot order for a successful disaster recovery for the entire system.

Figure 4:
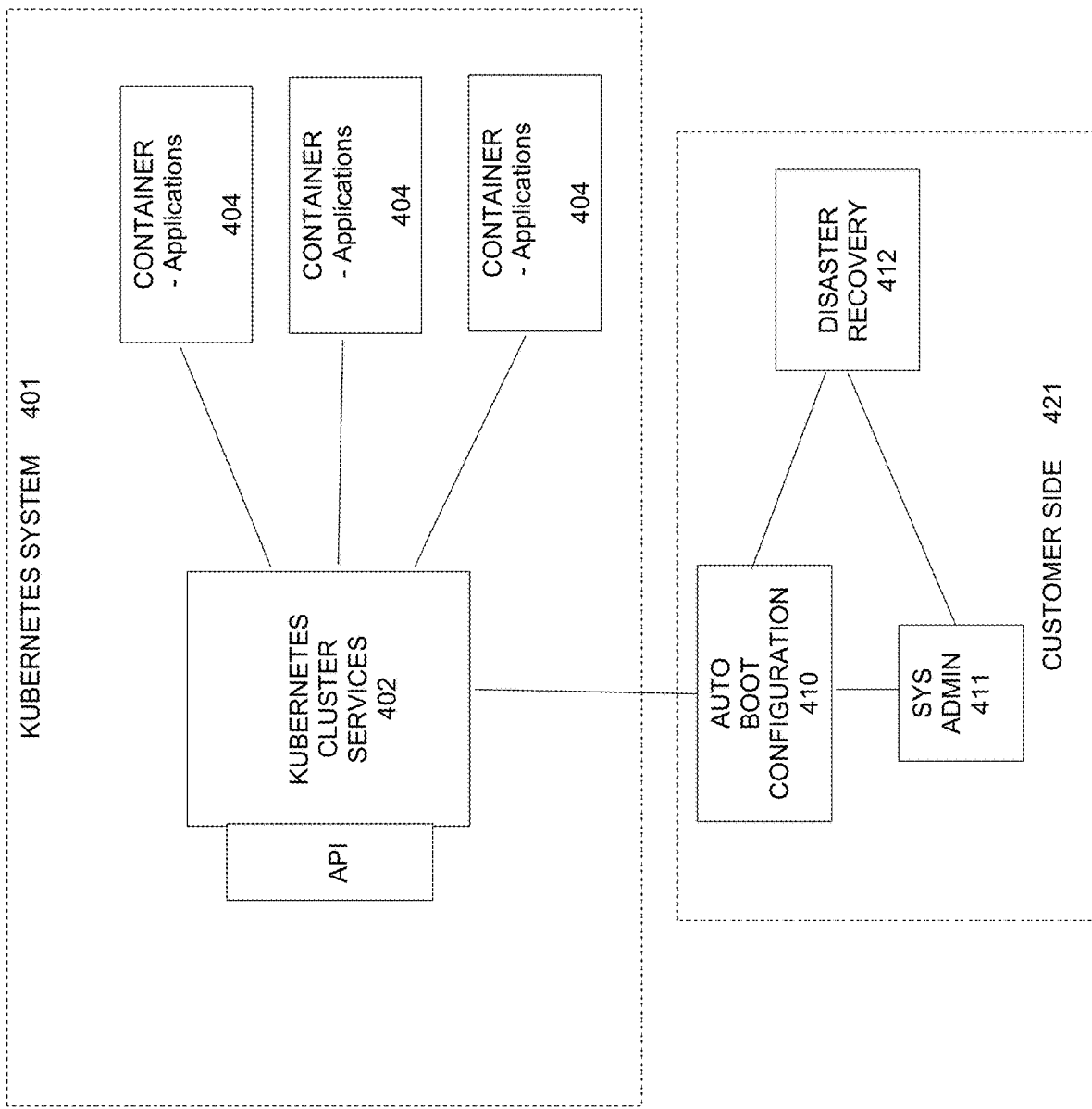
FIG. 4 illustrates providing an auto boot configuration process to a cluster services layer as an external appliance residing outside of the Kubernetes system, under some embodiments.

The auto boot configuration process may be implemented in one or more software processes, hardware components, or combination hardware/software components 110 executed in a component interacting with the container management layer 104, as shown in FIG. 2, or as a functional component 210 interacting with individual nodes 204 or a master 202, as shown in FIG. 3. It may also be provided as part of, our functionally coupled to, a cluster services layer or component as an external appliance residing outside of the Kubernetes system. This is illustrated in FIG. 4 in which a Kubernetes cluster services layer 402 of system 401 communicates with different worker nodes 404. The auto boot configuration process 410 provides certain business logic processes to help a system administrator 411 control a disaster recovery process 412. As shown in FIG. 4, process 410 may be deployed as part of a customer-side environment 421, such as through a network appliance, cloud-based solution, Software-as-a-Service (SaaS) solution, or any other similar deployment.

Figure 5:
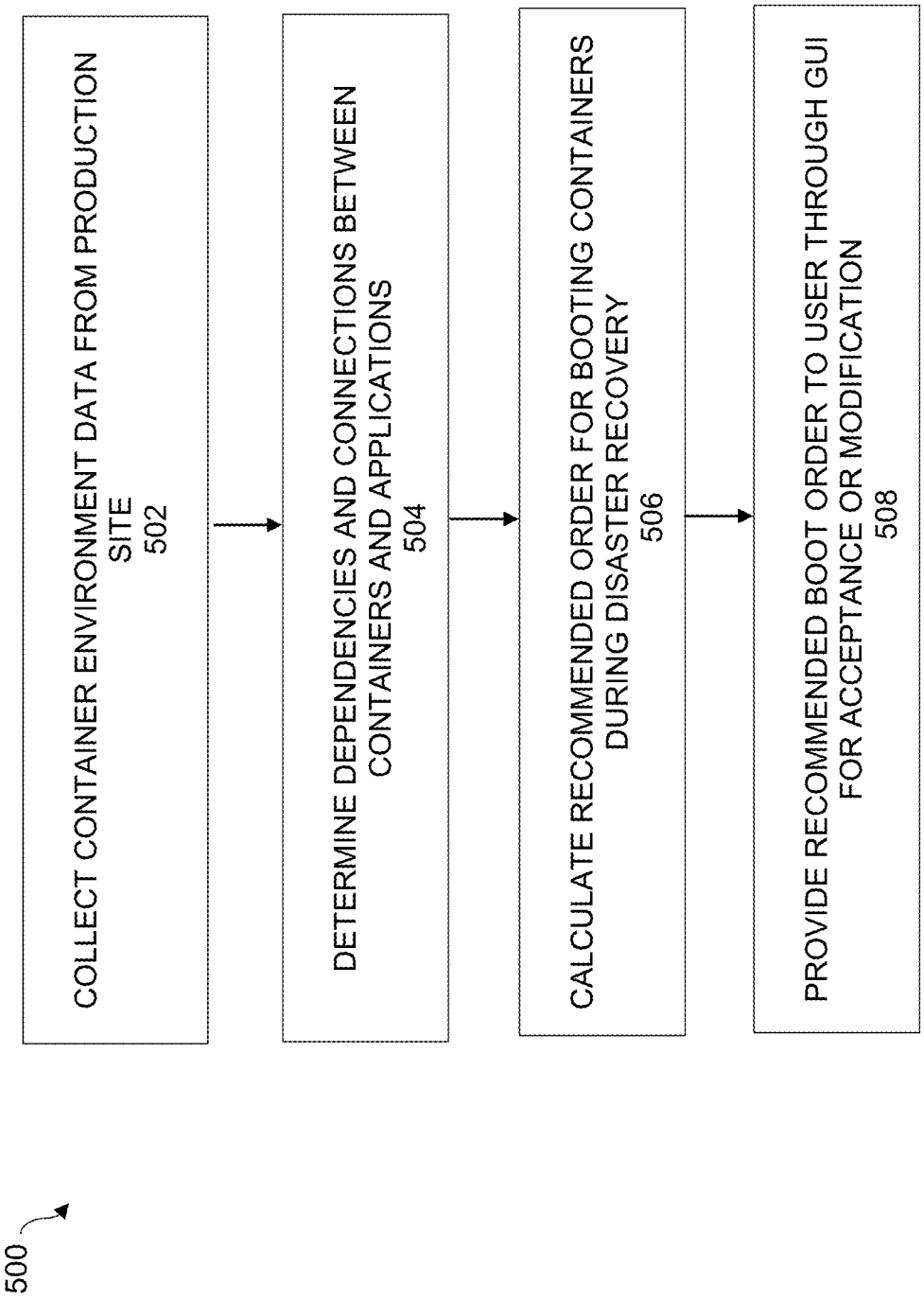
FIG. 5 is a flowchart illustrating a general method of providing container automatic boot recommendations for disaster recovery, under some embodiments.

FIG. 5 is a flowchart illustrating a general method of providing container automatic boot recommendations for disaster recovery, under some embodiments. As shown in FIG. 5, process flow 500 begins with step 502 with the auto boot configuration process collecting relevant container environment data from a production site, that is, a Kubernetes application that has a number of cloud native containers and applications managed by a cluster services process. The container environment data typically comprises metadata provided by the production site in standard data formats. The containers environments may be described in YAML format, or any other similar format. In an embodiment, the relevant environment data comprises certain system or operational parameters such as container type, network configuration and traffic, manual restarts of containers, and container management system configuration, among other parameters. Details of these parameters will be described in further detail below.

These parameters and other possible system characteristics, are used to determine dependencies and connections between the containers and applications, step 504. This information is then used to calculate a recommended order for booting or rebooting the containers during a disaster recovery process, step 506. This recommended order is then provided or communicated to a system administrator through a graphical user interface (GUI) or other appropriate means, step 508. The system administrator or other user can then accept the recommended boot order or modify as desired to appropriately control the disaster recovery process.

Figure 6:
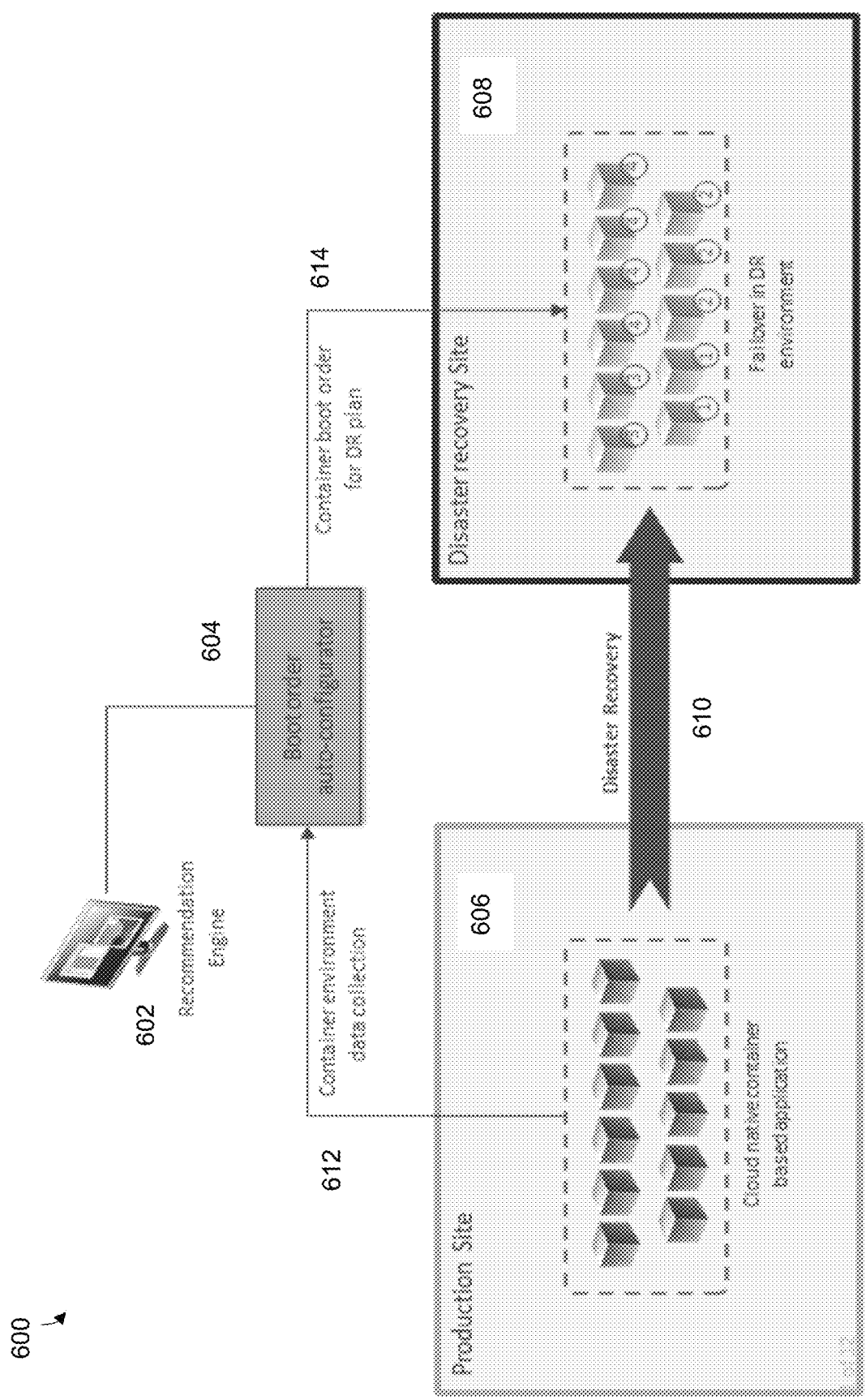
FIG. 6 is a system-level diagram that illustrates a boot order configuration component for use in a cloud native production site, under some embodiments.

FIG. 6 is a system-level diagram that illustrates a boot order configuration component for use in a cloud native production site, under some embodiments. As shown in FIG. 6, system 600 comprises a production site 606 that contains a large number of cloud native container-based applications. During a disaster recovery process, data from these applications is moved to a disaster recovery site 608 for storage in respective recovery containers or storage sites. The data path 610 represents the movement of data from the production site 606 to the disaster recovery site 608 during periodic or continuous backup of the data for DR purposes. It should be noted that the applications and data could represent any appropriate type of data such as database data, application data, and so on, for any number of different applications.

System 600 represents a large-scale cloud native system with multiple VMs and servers. The disaster recovery processes, such as failover, failback and so on, typically operate more efficiently and effectively if certain containers are booted before other containers. Although some information regarding preferred or default boot order is provided in present Docker/Kubernetes systems, large-scale implementations require a certain amount of intelligence to adequately handle large-scale cloud native container environments. That is, multiple applications and complex systems cannot rely on a single configuration database or manual boot configurations, as described in relation to FIG. 1. System 600 includes a boot order auto-configurator 604 that collects certain container environment data 612 from the production site 606 to determine an optimum container boot order 614 for the disaster recovery site 608. This recommendation is passed to the system administrator through a recommendation engine 602 operating through a GUI. It may also be passed directly to the disaster recovery site 608 for implementation by the DR process or processes.

In an embodiment, the boot order auto configuration component 604 executes the process illustrated in FIG. 5 by collecting relevant container environment data from the production site, calculating the recommended boot order which the user can review and edit, and facilitating automatic orchestration of the DR plan. This solution provides an automation solution which significantly simplifies disaster recovery configuration for cloud native container-based environments by automatically calculating the container boot order, dependencies, and priority. It generally makes the setup process of large-scale disaster recovery solutions faster and easier by saving manual configuration steps and reducing business continuity risks. The system may configure the boot order during the initial setup of the disaster recovery plan, but may also periodically check if there are any changes expected to the order and recommend them to the user.

As stated above, the boot order auto configurator 604 determines an optimum container boot order based on certain parameters. The first parameter is the container type. For this parameter, the system detects the type of the containers running and based on the container types it will set a boot order. Any number of available tools may be used to analyze the network and detect application activity. These can be used to identify and rank the most relevant types of containers. For example, a priority order based on certain containers may be set as follows: (1) containers using or exposing a storage service such as a file system will boot first, (2) container using database services will boot second, (3) other stateless containers will boot later, and (4) user-exposed containers will boot last.

A second parameter is network configuration and traffic. For this parameter, the container connections and dependencies are used to help determine boot priority. Based on each container's network and API (application programming interface) configuration, the traffic between the containers, and the initiation of connections, the system can automatically detect which containers have dependencies and what the best boot order is for these containers. This parameter helps set boot priority based on reliances or dependencies between containers on each other. For example, a container that is dependent on another container may always be recommended to boot after the other container. This parameter may be subordinate or supersede the container type parameter based on certain defined rules that may dictate the weighting or priority of the system parameters in determining recommended boot order, as described below.

A third parameter is the manual restarts of containers. During maintenance, certain containers may be brought down and restarted as a matter of course. Monitoring the order in which containers are restarted will give indication for the system on the correct boot order configuration. This parameter may be determined through the use of system logs, which give an indication of how the system is operated during normal start and shutdown procedures. Any indication of a preferred container shutdown and restart order may be used by process 604 to help formulate the recommended boot order.

A fourth parameter is the container management system configuration. In some cases, a naïve container boot order recommendation can be deduced from the container management system configuration database, such as the Kubernetes or Docker database.

These enumerated parameters are provided as some example of possible system parameters used by process 604, and embodiments are not so limited. Other similar or alternative parameters may also be used depending on system configuration and requirements. For example, the actual DR plan may have an effect on the boot order as certain DR mechanisms may prefer certain containers be brought up first.

As implied above, the order of the four system parameters is provided roughly in their order of relative importance. That is, container type generally supersedes network configuration, manual restart, and default container management configuration, and so on. Alternatively, certain weights or re-ordering of priority may be provided to modify or further inform the recommended boot order. In this case, the recommended boot order for each container may be expressed as: $w_i P_i$, where w is the weight assigned to a particular parameter, P of the i number of parameters. The boot order auto-configurator may then apply the appropriate combinatorial logic to determine the appropriate boot order for the containers using a priority calculation for each container.

For the embodiment of FIG. 6, the process 604 provides the recommended boot order to the system admin or user through a recommendation engine 602 driving a GUI or other interface for communication to the user. This recommendation may be accepted by the user as is, or tools may be provided to allow the user to change or modify the boot order, based on certain overriding requirements or preferences. This recommended boot order may be provided in the form of a recommended boot order list with command boxes to allow the user to accept or modify the recommendation. FIG. 7 illustrates an example GUI display area showing the recommended container boot order to a user, under some embodiments. As shown in the simple example of FIG. 7, the user recommendation display screen 702 includes a number of boot priorities numbered from 1 to N depending on how many containers/applications are to be prioritized. The applications/containers determined by process 604 are then listed next to the corresponding priority number based on the determination of the auto-configurator 604. The user is then able to accept or modify the given boot order of specific containers. If the user elects to modify a boot order, a further GUI command option may be provided to allow the user to numerically enter a preferred priority, or move particular applications up or down the priority list in a graphical manner.

In an embodiment, certain machine learning (ML) or artificial intelligence (AI) mechanisms may be built in to the auto boot recommendation process 604 through the compilation of large data sets over time and/or a large number of production sites. In this case, certain ML or AI tools may be used to help derive recommended container boot orders for different types of production sites.

Embodiments of the boot order auto-configurator 110 can be used to help facilitate and implement efficient and effective backups, which are the core of the data protection and disaster recovery practices for enterprises. Various different DR schemes may be implemented depending on the needs of the cloud native environment. Data protection (DP) enables recovery of data on the production site from an operational error, copies are from multiple point in time. The replica copy can be on the same site for this purpose. Disaster recovery (DR) provides a full data recovery solution for a cases where there is a full production site disaster. For this reason a DR must have a replica copy on a remote site. The copy can be the latest point in time but DR may also support operational recovery from multiple point in time.

Embodiments may be used in conjunction with certain purposive DR tools, such as VMware RecoverPoint to perform any point-in-time (PiT) replication to create multiple application consistent point-in-time snapshots. In general, RecoverPoint for virtual machines uses a journal-based implementation to hold the PiT information of all changes made to the protected data. It provides the shortest recovery time to the latest PiT via journal technology enables recovery to just seconds or fractions of a second before data corruption occurred. RecoverPoint for VMs is a fully virtualized hypervisor-based replication and automated disaster recovery solution. Depending on system configuration, flexible deployment configurations and hypervisor splitters may reside on all servers with protected workloads, allowing replication and recovery at the virtual disk (VMDK and RDM) granularity level. The I/O splitter resides within the hypervisor so that RecoverPoint for VMs can replicate VMs to and from any storage array supported by the system, such as SAN, NAS, DAS, and vSAN. Although embodiments are described with respect to RecoverPoint for PiT snapshot implementation, any other similar program or product may be used.

Figure 8:
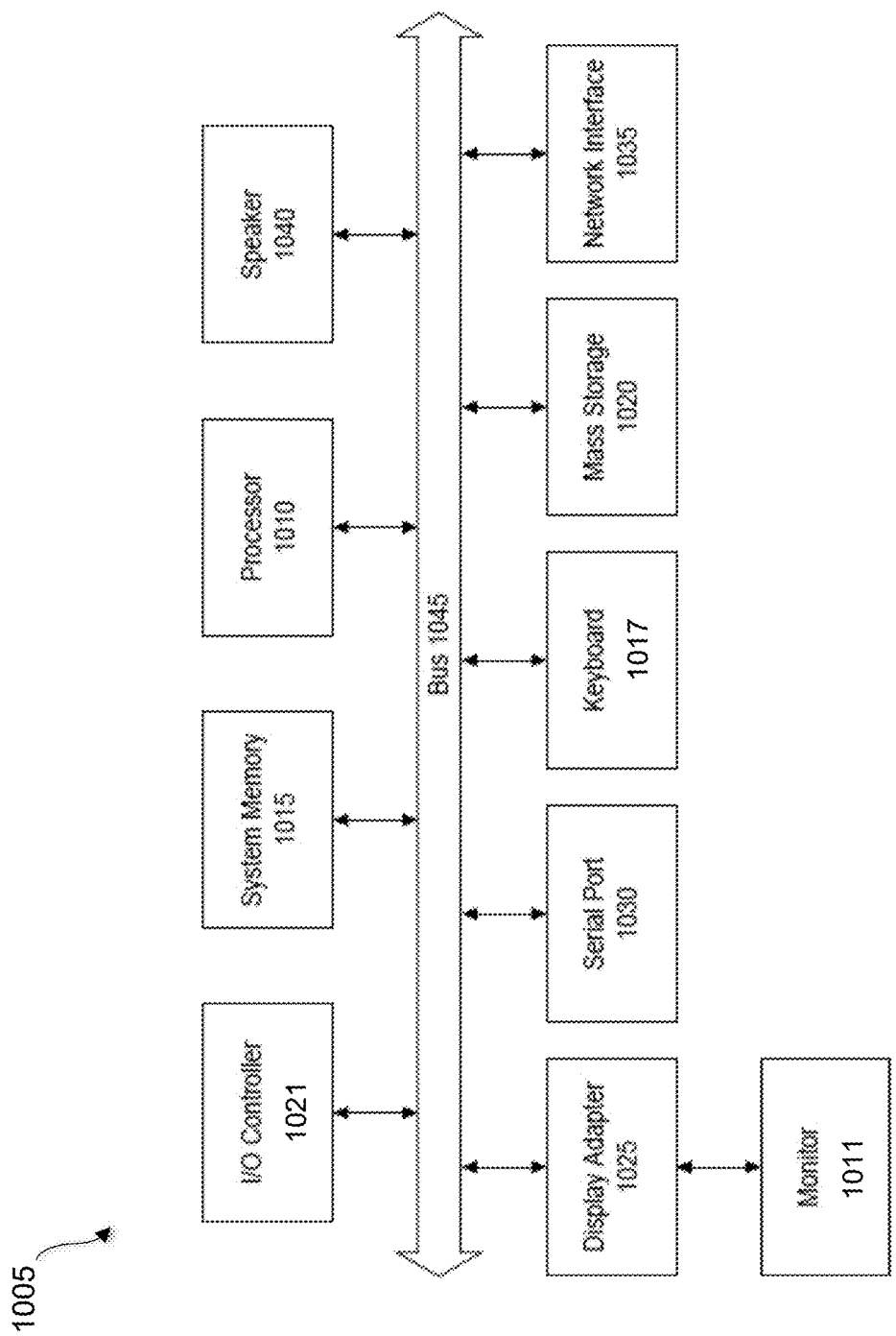
FIG. 8 shows a system block diagram of a computer system used to execute one or more software components of the present system described herein.

The network of FIG. 1 may comprise any number of individual client-server networks including virtual machines coupled over the Internet or similar large-scale network or portion thereof. Each processing device in the network or container system may comprise a computing device capable of executing software code to perform the processing steps described herein. FIG. 8 shows a system block diagram of a computer system used to execute one or more software components of the methods and systems described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing a boot order for containers in a cloud native application environment, comprising:
   collecting container environment data from a first container site;
   determining dependencies and connections between the containers and applications executed within the containers based on a number of system parameters comprising container type, network configuration and traffic, manual restarts of containers, and container management system configuration;
   assigning weighting values to each system parameter indicating a relative importance of a parameter relative to other parameters of the system parameters to produce weighted parameters;
   calculating a recommended order for booting or rebooting the containers during a disaster recovery process by combining the weighted parameters; and
   communicating the recommended order to a system administrator through a graphical user interface (GUI) for acceptance or modification by the system administrator.

2. The method of claim 1 wherein the container type of each container is detected based on application activity, and include containers using or exposing a storage service such as a file system, containers using database services, stateless containers will boot later, and user-exposed containers.

3. The method of claim 1 wherein the network configuration and traffic for each container is determined by automatic detection of dependencies among the containers using network and API (application programming interface) configurations.

4. The method of claim 1 wherein the manual restarts of containers is determined by monitoring the order in which containers are restarted through the use of system logs indicating container operation during normal start and shutdown procedures.

5. The method of claim 1 wherein the container management system configuration is determined through a container management system configuration database.

6. The method of claim 1 wherein a cloud native application environment includes a container management system comprising a Kubernetes system.

7. The method of claim 6 wherein the first site comprises a Kubernetes production site.

8. The method of claim 7 wherein the disaster recovery process comprises writing the data of the containers to target containers of a disaster recovery site coupled to the production site over a network and invoking failover or failback data replication operations in event of failure or compromise of the production site.

9. The method of claim 8 wherein target containers of the disaster recovery site are booted in the recommended order as accepted or modified by the system administrator.

10. A computer-implemented method of providing disaster recovery in a cloud native application environment, comprising:
    collecting, from a production site, container environment data comprising container types, network configuration and traffic, manual restarts of containers, and container management system configuration as respective system parameters;
    assigning weighting values to each system parameter indicating a relative importance of a parameter relative to other parameters of the system parameters to produce weighted parameters;
    determining a recommended order for booting or rebooting the containers during a disaster recovery process based on the collected container environment data by combining the weighted parameters;
    writing the data of the containers to target containers of a disaster recovery site coupled to the production site over a network;
    invoking a failover or failback data replication operation in event of failure or compromise of the production site; and
    booting the target containers of the disaster recovery site in the recommended order.

11. The method of claim 10 further comprising determining dependencies and connections between the containers and applications executed within the containers based on the container environment data.

12. The method of claim 11 further comprising communicating the recommended order to a system administrator through a graphical user interface (GUI) for acceptance or modification by the system administrator.

13. The method of claim 12 further comprising booting the target containers in the recommended order as modified by the system administrator.

14. The method of claim 10 wherein the container management system comprises a Kubernetes system.

15. A system comprising a processor-based executable module configured to provide a boot order for containers in a cloud native application environment, comprising:
   a hardware processor-based boot order auto-configurator collecting container environment data from a first container site, determining dependencies and connections between the containers and applications executed within the containers based on a number of system parameters comprising container type, network configuration and traffic, manual restarts of containers, and container management system configuration, assigning weighting values to each system parameter indicating a relative importance of a parameter relative to other parameters of the system parameters to produce weighted parameters, and calculating a recommended order for booting or rebooting the containers during a disaster recovery process by combining the weighted parameters; and
   a hardware processor-based recommendation engine coupled to memory storing executable programming instructions and further coupled to the boot order auto-configurator and communicating the recommended order to a system administrator through a graphical user interface (GUI) for acceptance or modification by the system administrator.

16. The system of claim 15 wherein a cloud native application environment includes a container management system comprising a Kubernetes system, and wherein the first site comprises a Kubernetes production site.

17. The system of claim 16 further comprising a disaster recovery component writing the data of the containers to target containers of a disaster recovery site coupled to the production site over a network and invoking failover or failback data replication operations in event of failure or compromise of the production site, and wherein target containers of the disaster recovery site are booted in the recommended order as accepted or modified by the system administrator.

18. The system of claim 17 wherein:
   the container type of each container is detected based on application activity, and include containers using or exposing a storage service such as a file system, containers using database services, stateless containers will boot later, and user-exposed containers;
   the network configuration and traffic for each container is determined by automatic detection of dependencies among the containers using network and API (application programming interface) configurations;
   the manual restarts of containers is determined by monitoring the order in which containers are restarted through the use of system logs indicating container operation during normal start and shutdown procedures; and
   the container management system configuration is determined through a container management system configuration database.

* * * * *